(12) United States Patent
Ramasamy et al.

(10) Patent No.: US 11,513,569 B1
(45) Date of Patent: Nov. 29, 2022

(54) SYSTEM AND METHOD FOR USING A HANDLE LUG STRUCTURAL ELEMENT AS AN ELECTROMAGNETIC INTERFERENCE GROUNDING ELEMENT AND AN ANTENNA RADIATOR

(71) Applicant: Dell Products, LP, Round Rock, TX (US)

(72) Inventors: Suresh K. Ramasamy, Cedar Park, TX (US); Sumana Pallampati, Nagpur (IN)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 17/379,311

(22) Filed: Jul. 19, 2021

(51) Int. Cl.
*H01Q 1/22* (2006.01)
*G06F 1/16* (2006.01)
*H01Q 1/52* (2006.01)
*H01Q 1/24* (2006.01)
*H01Q 1/38* (2006.01)

(52) U.S. Cl.
CPC .......... *G06F 1/1698* (2013.01); *G06F 1/1656* (2013.01); *H01Q 1/2266* (2013.01); *H01Q 1/243* (2013.01); *H01Q 1/38* (2013.01); *H01Q 1/526* (2013.01)

(58) Field of Classification Search
CPC .. H01Q 1/22; H01Q 1/24; H01Q 1/38; H01Q 1/52; G06F 1/16
See application file for complete search history.

(56) References Cited

U.S. PATENT DOCUMENTS

| | | |
|---|---|---|
| 5,709,832 A | 1/1998 | Hayes |
| 7,345,637 B2 | 3/2008 | Mizoguchi |
| 8,384,600 B2 | 2/2013 | Huang |
| 10,219,389 B2 | 2/2019 | Islam |
| 10,892,565 B2 * | 1/2021 | Wei .......................... H01Q 1/48 |
| 2014/0354483 A1 * | 12/2014 | Azad ...................... H01Q 1/243 |
| | | 343/700 MS |
| 2018/0034134 A1 | 2/2018 | Dalmia |
| 2020/0192424 A1 | 6/2020 | Wei |
| 2020/0194905 A1 | 6/2020 | Wei |
| 2021/0175607 A1 | 6/2021 | Ramasamy |
| 2021/0175608 A1 | 6/2021 | Ramasamy |

FOREIGN PATENT DOCUMENTS

WO 2015/079101 A1 6/2015

* cited by examiner

*Primary Examiner* — Andrea Lindgren Baltzell
(74) *Attorney, Agent, or Firm* — Prol Intellectual Property Law, PLLC; H. Kenneth Prol

(57) ABSTRACT

An information handling system to wirelessly transmit and receive data at an antenna may include a processor; a memory; a power management unit; a display housing containing components of the information handling system, the display housing including a handle and a handle lug to secure the handle to the display housing; a wireless adapter and an antenna to transmit data wirelessly via a WLAN antenna; and handle lug parasitic coupling device operatively coupled to the handle lug to parasitically couple the WLAN antenna to a handle lug parasitic coupling device and handle lug to create a multi-band WLAN antenna.

20 Claims, 6 Drawing Sheets

SYSTEM AND METHOD FOR USING A HANDLE LUG STRUCTURAL ELEMENT AS AN ELECTROMAGNETIC INTERFERENCE GROUNDING ELEMENT AND AN ANTENNA RADIATOR

FIELD OF THE DISCLOSURE

The present disclosure generally relates to information handling systems, and more particularly relates to an information handling system including an antenna formed within or operatively coupled to a chassis of the information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include an antenna system that allows the information handling system to be operatively coupled to a wireless communication network.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1A:
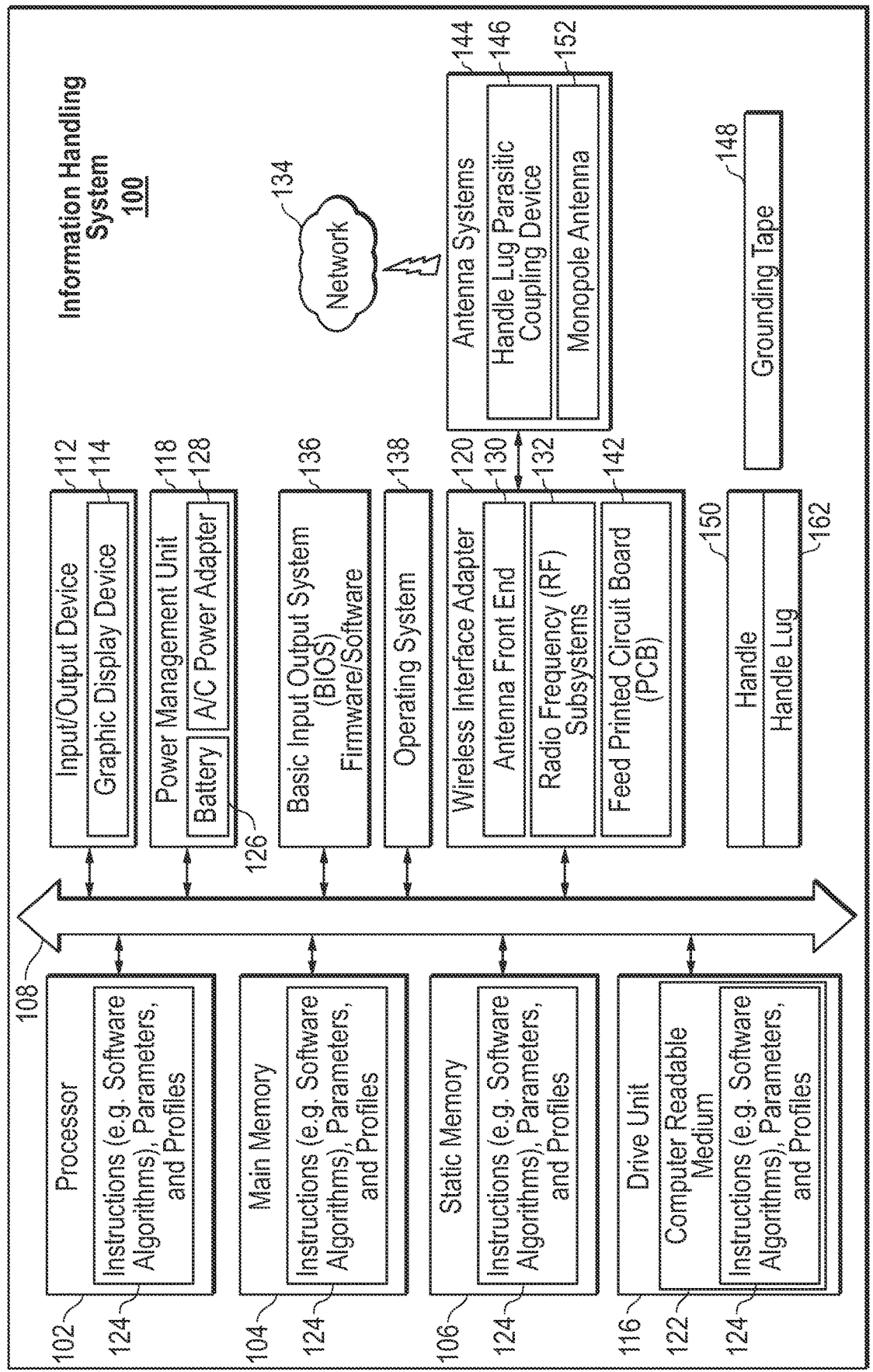
FIG. 1A is a block diagram of an information handling system including a handle lug and grounding tape according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

For aesthetic, strength, and performance reasons, information handling system chassis parts are more commonly designed with a metal structure. Additionally, ruggedized information handling systems used for first responders and other personnel in the field are used to support mission critical applications that demand best in class wireless connectivity protocols such as 4G LTE, 5G LTE, and Wi-Fi 6 and 6E, among others. These wireless connectivity protocols may be used to operate a N×N MIMO wireless connection (e.g., 4×4 MIMO cellular connection) to reach high speed data transmission and reception. The 5G protocol, for example, may require a 4×4 cellular antenna connection to reach 5G speeds and to support E-UTRAN New Radio (EN-DC) dual connectivity protocols. At the same time, the demands for wireless operation over growing electromagnetic spectrums also increase. This includes addition of many simultaneously operating radiofrequency systems, addition of more antennas, and utilization of various antenna types that are being developed for use with hardware associated with 5G communications. The inclusion of these additional antennas requires additional space within or coupled to the chassis of the ruggedized information handling system to fit, for example, more 4×4 5G cellular antennas or WiFi 6e 2×2 antennas. Ruggedized information handling systems in tablet form factors, for example, have limited real estate within the chassis in order to add dedicated antennas. Still further, with the advent of Wi-Fi 6 and 6e standards, the ability of an information handling system to transmit and receive data to and from a WLAN network has been a goal. By including these additional antennas into the information handling system, space within or around the chassis of the information handling system is decreased. Otherwise, the size of the chassis of the information handling system must be increased in order to accommodate for these additional antennas. Even still further, with the advent of multiple-in-multiple-out (MIMO) communications, those antennas included within the information handlings system may be allowed to cooperate to provide these MIMO communications. However, with such short radio frequencies (RF) used to transmit and receive data (e.g., 5 GHz to 6 GHz or larger) various sources of electromagnetic interference (EMI) may hinder the ability to transmit and receive data either to a WLAN network or a WWAN network.

Previous information handling systems may have addressed these competing needs by providing for, for example, cutout portions of a metal outer chassis cover filled with plastic behind which radio transmitters would be mounted. The cutouts to accommodate radio frequency (RF) transmitters were often located in aesthetically undesirable locations or required additional plastic components to cover the cutout, thus not fully meeting the streamlining needs. The plastic components added a component to be manufactured and were required to be seamlessly integrated into an otherwise smooth metal chassis cover, and the antennas would occupy precious chassis space.

Embodiments of the present disclosure may allow for other hardware within the information handling system in order to accommodate for the placement of additional antennas therein. For example, the handle lugs used in the ruggedized information handling system to operatively couple a handle to the information handling system of the present embodiments may be used to secure a handle lug parasitic coupling device to the antenna and operate as a parasitic coupling structure for augmentation of a radio frequency (RF) emitted by the antenna. The handle lug parasitic coupling device held by the handle lug of the embodiments described herein may also serve as an electromagnetic interference (EMI) protection structure operatively coupled to other components of the information handling system such as a flexible printed circuit (FPC) of a camera device. Along with any other grounding tape or other grounding structure, the handle lug parasitic coupling device may ground the FPC to a motherboard in the information handling system according to embodiments of the present description.

The present disclosure provides a system and method for a ruggedized information handling system that includes a display housing containing components of the information handling system, the display housing, a handle, and a handle lug to secure the handle to the display housing. The system and method may include a handle lug parasitic coupling device operatively coupled to the handle lug to parasitically couple a WLAN (or WWAN) antenna system to the handle lug to create a multi-band WLAN or WWAN antenna. The antenna coupled to the handle lug, in one example embodiment, operates as a Wi-Fi 6 or 6E antenna. The handle lug parasitic coupling device is operatively coupled to the radio frequency (RF) radiating element and its length is sized to operate at the lowest frequency of the Wi-Fi 6 or 6E antenna in an example embodiment. The use of the handle lug has a dual-purpose function: for EMI protection and as an antenna radiating element. This further saves space used within the chassis of the ruggedized information handling system instead of adding additional antennas forcing an increase in the size of the chassis or elimination of other hardware from within the chassis to accommodate space for this additional antenna. Multiple handle lugs in the chassis may further be used for exciting multiple antennas in a similar fashion in some embodiments. This arrangement of antennas enables 5G and WiFi 6e type communications as well in some embodiments.

In an embodiment, other hardware may be present that could benefit from the grounding functions of the handle lug parasitic coupling device. This may include a camera device that uses a conductive tape to ground the camera device. The conductive tape may create an electromagnetic interference grounding source for the camera device while also operatively coupling the grounding source to the handle lug parasitic coupling device. In an embodiment, the conductive tape may include a cut out slot formed therein to create a radiating aperture that, when excited, radiates at, for example, 1.8 GHz. Therefore, in addition to the multi-band WLAN (or WWAN) antenna operating concurrently at 5 GHz and 2.4 Ghz, this 1.8 GHz radiating aperture allows for greater transceiving range in an example embodiment.

In an embodiment, the antenna formed at the one or more handle lugs may operate as a Wi-Fi antenna, a 4G LTE antenna, or a 5G antenna emitting radio frequencies according to those associated with those standards. Along with two other 4G LTE antennas, the antennas formed at the handle lugs may operate as two 2×2 4G LTE transceiving antennas in an embodiment. In another embodiment, the antennas formed at the handle lugs may operate, along with two other 5G cellular antennas may operate at a 4×4 MIMO antenna array. In an embodiment, antennas formed at the handle lugs may operate may operate individually or with each other to provide high data transmission or reception.

Examples are set forth below with respect to particular aspects of an information handling system including case portions may also be understood to also apply to a laptop information handling system that includes the chassis components designed with a fully metal structure and configurable such that the information handling system may operate in any of several usage mode configurations in some embodiments.

FIG. 1 is a block diagram of an information handling system 100 capable of administering each of the specific embodiments of the present disclosure. The information handling system 100, in an embodiment, can represent the mobile information handling systems 210, 220, and 230 or servers or systems located anywhere within network 200 described in connection with FIG. 2 herein, including the remote data centers operating virtual machine applications. Information handling system 100 may represent a mobile information handling system associated with a user or recipient of intended wireless communication. A mobile information handling system may execute instructions via a processor such as a microcontroller unit (MCU) operating both firmware instructions or hardwired instructions for the wireless interface adapter 120 to, along with the antenna front end 130, radio frequency (RF) subsystems 132, and antenna systems 144, achieve WLAN or WWAN communications according to embodiments disclosed herein. The application programs operating on the information handling system 100 may communicate or otherwise operate via concurrent wireless links, individual wireless links, or combinations over any available radio access technology (RAT) protocols including WLAN protocols and WWAN protocols. These application programs may operate in some example embodiments as software, in whole or in part, on an information handling system while other portions of the software applications may operate on remote server systems.

The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video/graphic display device 114, such as a liquid crystal display (LCD), an organic light emitting diode (OLED), a flat panel display, or a solid-state display. The video/graphic display device 114 may include a touch screen display module and touch screen controller (not shown) for receiving user inputs to the information handling system 100. Touch screen display module may detect touch or proximity to a display screen by detecting capacitance changes in the display screen as understood by those of skill. Additionally, the information handling system 100 may include any additional input/output device 112, such as a keyboard, a printer, and a cursor control device, such as a mouse or touchpad or similar peripheral input device to allow a user to interact with the operations of the information handling system 100.

The information handling system 100 may further include a power management unit (PMU) 118 (a.k.a. a power supply unit (PSU)). The PMU 118 may manage the power provided to the components of the information handling system 100 such as the processor 102, a cooling system, one or more drive units 116, a graphical processing unit (GPU), a video/graphic display device or other input/output devices 112, and other components that may require power when a power button has been actuated by a user. In an embodiment, the PMU 118 may be electrically coupled to the information handling system 100 to provide this power and coupled to bus 108 to provide or receive data or instructions. The PMU 118 may regulate power from a power source such as a battery 126 or A/C power adapter 128. In an embodiment, the battery 126 may be charged via the A/C power adapter 128 and provide power to the components of the information handling system 100 when A/C power from the A/C power adapter 128 is removed. Input/output (I/O) devices 112 may include a keyboard, cursor, touchpad, touchscreen, camera or other systems used with the information handling system 100.

In an embodiment, the information handling system 100 can also represent a server device whose resources can be shared by multiple client devices in an embodiment. In another embodiment, the information handling system 100 may represent an individual client device, such as a desktop personal computer, a laptop computer, a tablet computer, a 360-degree convertible device, a wearable computing device, or a mobile smart phone that communicates to a network 134 via the wireless interface adapter 120 and its associated antenna systems 144 as described herein.

The information handling system 100 can include sets of instructions 124 that can be executed to cause the computer system to perform any one or more desired applications. In many aspects, sets of instructions 124 may implement wireless communications via one or more antenna systems 144 available on information handling system 100. Operation of WLAN and WWAN wireless communications may be enhanced or otherwise improved via WLAN or WWAN antenna operation adjustments via the methods or controller-based functions relating to an antenna adaptation controller or other circuitry used to adjust the direction or power of the signals of the antennas described herein. For example, instructions or a controller may execute software or firmware applications or algorithms which utilize one or more wireless signal parameters via the wireless adapter interface for wireless communications via the wireless interface adapter as well as other aspects or components.

Various software modules comprising software application instructions 124 or firmware instructions may be coordinated by an operating system (OS) 138 and via an application programming interface (API). An example OS 138 may include Windows®, Android®, and other OS 138 types known in the art. Example APIs may include Win 32®, Core Java® API, Android® APIs, or wireless adapter driver API. In a further example, processor 102 may conduct processing of mobile information handling system applications by the information handling system 100 according to the systems and methods disclosed herein which may utilize wireless communications. In the embodiments, the OS 138 may be bootstrapped using a basic input/output system (BIOS) firmware/software 136 to initiate a user interface with the user. The computer system 100 may operate as a standalone device or may be connected such as using a network, to other computer systems or peripheral devices. In other aspects, additional processor or control logic may be implemented in graphical processor units (GPUs) or controllers located with radio modules or within the wireless interface adapter 120 to implement method embodiments of the present embodiments. Code instructions 124 in firmware, hardware or some combination may be executed to implement operations of the wireless interface adapter 120 and its associated antenna systems 144 for example.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile information handling system, a tablet computer, a laptop computer, a desktop computer, a communications device, a wireless smart phone, wearable computing devices, a control system, a camera, a scanner, a printer, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions. In the embodiments presented herein, the information handling system is described as a ruggedized information handling system 100 that includes a handle used by the user to transport the information handling system from location to location. Although this specific embodiment is described herein, it is contemplated that the principles and functions of this ruggedized information handling system 100 may be equally applied to other types of information handling systems.

The disk drive unit 116 of the information handling system 100 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. The disk drive unit 116 and static memory 106 also contains space for data storage. Some memory or storage may reside in the wireless interface adapter 120. Further, the instructions 124 that embody one or more of the methods or logic as described herein may be included within any storage device described.

The network interface device shown as wireless interface adapter 120 can provide connectivity to a network 134, e.g., a wide area network (WAN), a local area network (LAN), wireless local area network (WLAN), a wireless personal area network (WPAN), a wireless wide area network (WWAN), or other types of networks. Connectivity may be via wired or wireless connection. Wireless interface adapter 120 may include one or more radio frequency (RF) subsystems 132 with transmitter/receiver circuitry, modem circuitry, one or more antenna front end 130 circuits, one or more wireless controller circuits, amplifiers, antenna systems 144 and other RF subsystem circuitry used for wireless communications via multiple radio access technologies. Each RF subsystem 132 may communicate with one or more wireless technology protocols and operate as a WWAN module or WLAN module in various embodiments. The RF subsystem 132 may contain individual subscriber identity module (SIM) profiles for each technology service provider and their available protocols for subscriber-based radio access technologies such as cellular LTE communications in an example. The wireless interface adapter 120 may also include antenna systems 144 which, according to the embodiments described herein, may be tunable antenna systems or may include an antenna adaptation network for use with the system and methods disclosed herein to optimize antenna system operation. Additional antenna system adaptation network circuitry (not shown) may also be included with the wireless interface adapter 120 to implement WLAN or WWAN modification measures for utilization of one or more antenna systems 144.

In some aspects of the present disclosure, a wireless interface adapter 120 may operate one or more wireless links. In a further aspect, the wireless interface adapter 120 may operate the one or more wireless links with a single, shared communication frequency band such as with the Wi-Fi WLAN operation or 5G LTE standard WWAN operations in an example aspect. For example, a 5 GHz wireless communication frequency band may be apportioned under the 5G standards for communication on either small cell WWAN wireless link operation or Wi-Fi WLAN operation as well as other wireless activity in LTE, WiFi, WiGig, Bluetooth, or other communication protocols. In some embodiments, the shared, wireless communication bands may be transmitted through one or more antenna systems 144. Other communication frequency bands are contemplated for use with the embodiments of the present disclosure as well.

The wireless interface adapter 120 may operate the antenna systems 144 with a monopole antennas 152 described herein in accordance with any wireless data communication standards in an example embodiment. To communicate with a wireless network, standards including IEEE 802.11 WLAN standards, IEEE 802.15 WPAN standards, WWAN such as 3GPP or 3GPP2, or similar wireless standards may be used. Wireless interface adapter 120 may connect to any combination of cellular wireless connections including 2G, 2.5G, 3G, 4G, 5G or the like from one or more service providers for example. Utilization of radiofrequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax. It is understood that any number of available channels may be available under the example 5 GHz shared communication frequency band or any implemented frequency band. WLAN, for example, may also operate at a 2.4 GHz band. WWAN may operate in a number of bands, some of which are proprietary but may include a wireless communication frequency band at approximately 2.5 GHz or 5 GHz bands for example. In additional examples, WWAN carrier licensed bands may operate at frequency bands of approximately 700 MHz, 800 MHz, 1900 MHz, or 1700/2100 MHz as well as others in the new radio frequency range 1 (NRFR1) or NFRF2 bands, and other known bands. In the example embodiment, mobile information handling system 100 includes both unlicensed wireless RF communication capabilities as well as licensed wireless RF communication capabilities. For example, licensed wireless RF communication capabilities may be available via a subscriber carrier wireless service. With the licensed wireless RF communication capability, WWAN RF front end may operate on a licensed WWAN wireless radio with authorization for subscriber access to a wireless service provider on a carrier licensed frequency band.

The wireless interface adapter 120 can represent an add-in card, wireless network interface module that is integrated with a main board of the information handling system or integrated with another wireless network interface capability, or any combination thereof. In an embodiment the wireless interface adapter 120 may include one or more RF subsystems 132 including transmitters and wireless controllers such as wireless module subsystems for connecting via a multitude of wireless links under a variety of protocols. In an example embodiment, an information handling system 100 may have an antenna system 144 transmitter (e.g., the monopole antenna described herein) for 5G small cell WWAN, Wi-Fi WLAN or WiGig connectivity and one or more additional antenna system 144 transmitters (e.g., another monopole antenna) for cellular communication. The RF subsystems 132 for various protocol modules include wireless controllers to manage authentication, connectivity, communications, power levels for transmission, buffering, error correction, baseband processing, and other functions of the wireless interface adapter 120.

The RF subsystems 132 of the wireless interface adapter(s) 120 may also measure various metrics relating to wireless communication pursuant to operation of an antenna system as in the present disclosure. For example, the wireless controller of a RF subsystem 132 may manage detecting and measuring received signal strength levels, bit error rates, signal to noise ratios, latencies, power delay profile, delay spread, and other metrics relating to signal quality and strength. Such detected and measured aspects of wireless links, such as WLAN links operating on one or more antenna systems 144, may be used to adapt the antenna systems 144 that would secure the best wireless connection to either a WWAN or a WLAN using the best wireless protocol and radio frequencies, channels or bands. In an embodiment, a wireless controller of a wireless interface adapter 120 may manage one or more RF subsystems 132. The wireless controller also manages transmission power levels which directly affect RF subsystem power consumption as well as transmission power levels from the plurality of antenna systems 144. The transmission power levels from the antenna systems 144 may be relevant to specific absorption rate (SAR) safety limitations for transmitting mobile information handling systems. To control and measure power consumption via a RF subsystem 132, the RF subsystem 132 may control and measure current and voltage power that is directed to operate one or more antenna systems 144.

The information handling system 100 may include any number of antenna systems 144 used to operatively couple the information handling system 100 to a wireless network 134. The antenna systems 144 may include any type of antenna used to emit a RF signal and receive RF signals. In an embodiment, the antennas are monopole antennas 152. The antenna systems 144 may further include a handle lug parasitic coupling device 146. In an embodiment, the handle lug parasitic coupling device 146 may be operatively coupled to a handle lug 162 used to couple the handle 150 to the body of the information handling system. This allows the handle lug parasitic coupling device 146 to be operatively coupled at a location of the chassis of the information handling system 100 where a monopole antenna 152 is present or may be placed without increasing the space within the chassis of the information handling system 100 or using space within the chassis dedicated to other hardware.

The handle lug parasitic coupling device 146 may be operatively coupled to a monopole antenna 152. In an embodiment, the handle lug parasitic coupling device 146 may be used to selectively change the RF emitted from the monopole antenna 152 structure so that the range of RF emitted by the monopole antenna 152 may be increased. The monopole antenna 152, in an embodiment, is sized to emit RFs that include those RFs associated with any WLAN (such as Wi-Fi), WLAN (such as 4G or 5G), licensed or unlicensed RFs as within the capability of a particular monopole antenna 152 based on length or grounding. In an embodiment, the monopole antenna 152 with the handle lug parasitic coupling device 146 may operate at a 2.4 GHz frequency. In an embodiment, the monopole antenna 152 with the handle lug parasitic coupling device 146 may operate at a 5 GHz frequency. In an embodiment, the monopole antenna 152 with the handle lug parasitic coupling device 146 may operate, concurrently, at a 2.4 GHz frequency and a 5 GHz frequency.

Along with operating as a parasitic element, the handle lug parasitic coupling device 146 may operate a part of an electromagnetic interference (EMI) grounding element. The information handling system 100 may include other hardware devices such as a camera that are placed next to the monopole antenna 152. These types of hardware devices may be susceptible to EMI surges and may even be damaged should the levels of EMI (e.g., an electromagnetic surge) are present during operation of the information handling system 100. In an embodiment, these hardware devices may include a flexible cable that is grounded to the motherboard via a grounding line in the flexible cable. This grounding line in the flexible cable may be grounded to the motherboard which, itself, may include a grounding source. In an embodiment, the handle lug parasitic coupling device 146 operatively coupled to the handle lug 162 acts as an EMI grounding element through the ground at the flexible cable and to ground at the motherboard.

In an embodiment, the information handling system 100 may include grounding tape 148. In an embodiment, the grounding tape 148 may ground the monopole antenna 152 to the flexible cable associated, for example, with an I/O device 112 such as a camera. This allows the grounding line in the flexible tape of the camera to be used to ground the monopole antenna 152 to then be grounded at the motherboard as well. Therefore, if and when an EMI surge occurs, the handle lug parasitic coupling device 146 acts as grounding source to protect the other hardware devices in the chassis of the information handling system 100 that may include the camera for example. Additionally, the grounding tape 148 may be used to ground the monopole antenna 152 along with other hardware in an embodiment.

In an embodiment, the monopole antenna 152 is sized and configured to operate, with the wireless interface adapter 120, in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, or similar wireless standards may be used. In an embodiment, the handle lug parasitic coupling device 146 may be sized and purposed to operate at 6 GHz and above frequencies and/or bands for WLAN Wi-Fi 6E. In an embodiment, the information handling system 100 may include two or more monopole antennas 152 with one monopole antenna 152 located at a location where the handle 150 is operatively coupled to the chassis of the information handling system 100 via a handle lug 162. In an embodiment, the monopole antennas 152 may operate under a multiple-in-multiple-out (MIMO) configuration. With a MIMO configuration, the data transmission and reception speeds may be increased.

Wireless interface adapter 120 may, in other embodiments, connect to any combination of cellular wireless connections including 2G, 2.5G, 3G, 4G, 5G or the like from one or more service providers using the monopole antennas 152 as well. In an embodiment, the monopole antennas 152 may form part of a 5G MIMO configuration. In an embodiment, the number of monopole antennas 152 formed with the handle lug parasitic coupling device 146 are two. In this embodiment, the two monopole antennas 152 may operate on a 5G protocol with two other 5G antennas formed within the chassis of the information handling system 100 to form a 4×4 MIMO antenna configuration. In another embodiment the two monopole antennas 152 may operate together to form a 2×2 MIMO antenna configuration using a 4G protocol to transmit and receive data. In yet another embodiment, the two monopole antennas 152 may be combined with two other antennas formed within the chassis of the information handling system 100 to form a 4×4 MIMO antenna configuration using a 4G protocol to transmit and receive data.

The wireless network 134 may have a wireless mesh architecture in accordance with mesh networks described by the wireless data communications standards or similar standards in some embodiments but not necessarily in all embodiments. The wireless interface adapter 120 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal; so that a device connected to a network 134 can communicate voice, video or data over the network 134. Further, the instructions 124 may be transmitted or received over the network 134 via the network interface device or wireless interface adapter 120.

Information handling system 100 includes one or more application programs, and BIOS firmware/software 136. BIOS firmware/software 136 functions to initialize information handling system 100 on power up, to launch an OS 138, and to manage input and output interactions between the operating system and the other elements of information handling system 100. In a particular embodiment, BIOS firmware/software 136 reside in memory 104, and include machine-executable code that is executed by processor 102 to perform various functions of information handling system 100. In another embodiment (not illustrated), application programs and BIOS firmware/software 136 reside in another storage medium of information handling system 100. For example, application programs and BIOS firmware/software 136 can reside in drive 116, in a ROM (not illustrated) associated with information handling system 100, in an option-ROM (not illustrated) associated with various devices of information handling system 100, in storage system 107, in a storage system (not illustrated) associated with network channel of a wireless interface adapter 120, in another storage medium of information handling system 100, or a combination thereof. Application programs 124 and BIOS firmware/software 136 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 1B:
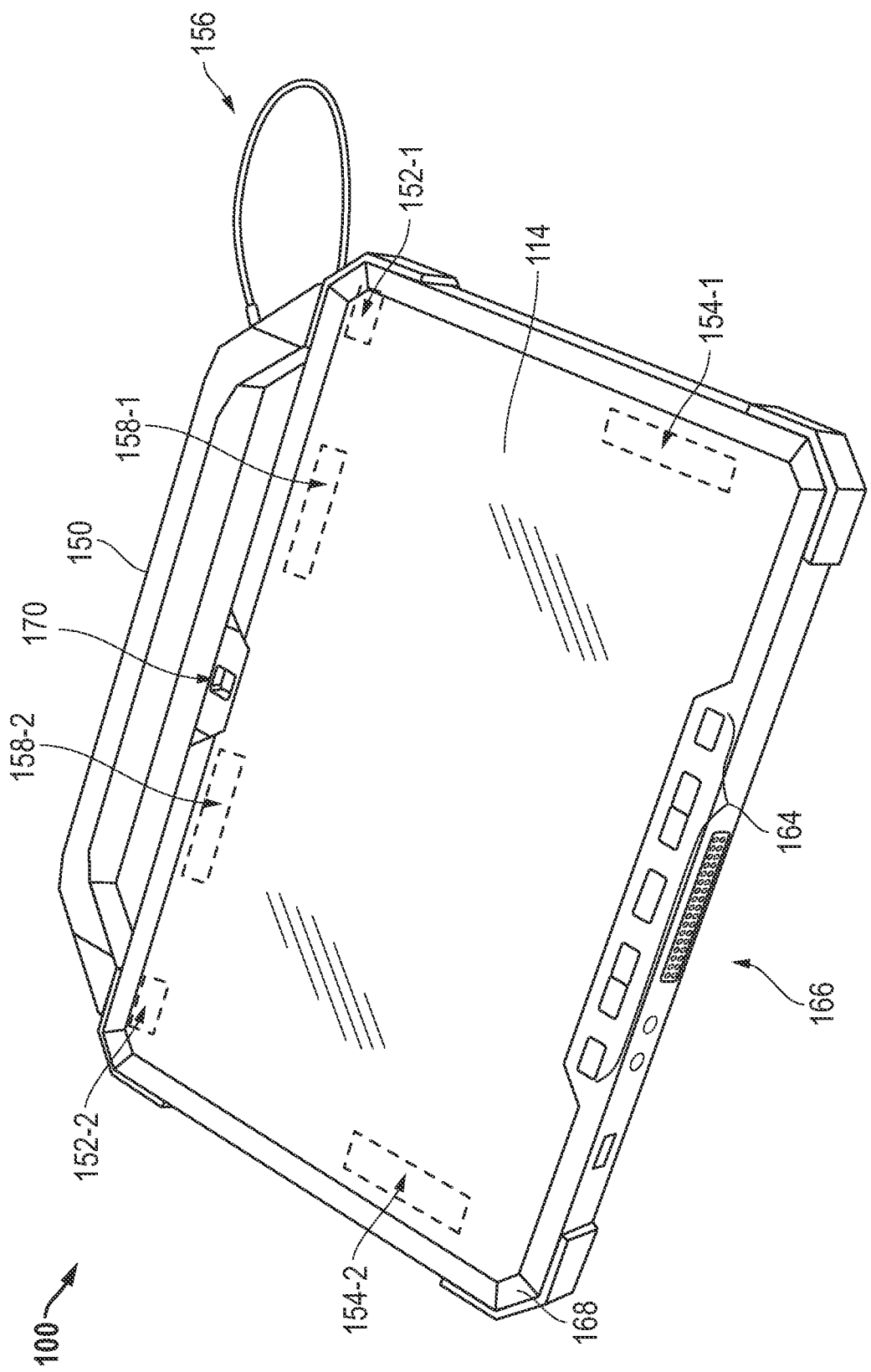
FIG. 1B is a graphical illustration of a ruggedized information handling system having a handle and an antenna formed at a location where the handle is coupled to the chassis of the information handling system according to another embodiment of the present disclosure.

FIG. 1B is a graphical illustration of a ruggedized information handling system 100 having a handle 150 and an antenna formed at a location where the handle 150 is coupled to the chassis of the information handling system 100 via handle lug (not shown) according to another embodiment of the present disclosure. The ruggedized information handling system 100 in the present embodiment may include rugged features of the information handling system 100 such as a rubberized outer housing 168 for the chassis, inset buttons 164, and contact points 166 used to couple to a docking station or other peripheral device, among other ruggedized features. These features may allow the information handling system 100 to be subjected to rougher environmental conditions than other types of information handling systems. The handle 150 may be used by, for example, a first responder to carry the ruggedized information handling system 100 to remote locations where these rougher environmental conditions are present. The ruggedized information handling system 100 may also include a tether 156 used to secure the information handling system 100, at least temporarily, to an object during use or transport.

In an embodiment, the ruggedized information handling system 100 may include a graphical display device 114 that may be a display screen and may include a touchscreen functionality. In a further embodiment, the ruggedized information handling system 100 may include a forward-facing camera 170. This forward-facing camera 170 may be used by the user to engage in video conferences or otherwise capture images of objects in front of this camera. In an embodiment, the ruggedized information handling system 100 may include a backwards-facing camera (not shown) formed on a back side of the information handling system 100. This camera may be used by the user to capture images or video as the user points the camera at an object. The user may select between using the forward-facing camera 170 or the backward-facing camera (not shown) using an image or video capturing application being executed on the information handling system 100.

As described herein, the ruggedized information handling system 100 may include a plurality of antennas used to operatively couple the information handling system 100 to a WWAN and/or WLAN. In the embodiment shown in FIG. 1B, the information handling system 100 may include a pair of Wi-Fi antennas 154-1 and 154-2 (at locations shown in dashed lines). This pair of Wi-Fi antennas 154-1 and 154-2 may be dedicated to operatively couple the information handling system 100 to an access point of a WLAN. In the embodiment shown in FIG. 1B, the pair of Wi-Fi antennas 154-1 and 154-2 may be placed along a side wall of the chassis of the information handling system 100. As described herein, the ruggedized information handling system 100 may include monopole antennas 152-1, 152-2 at locations shown by dashed lines that may be configured to operate as other WLAN antennas using, for example a Wi-Fi 6 or 6E standard similar to the pair of Wi-Fi antennas 154-1 and 154-2 formed along the sides of the chassis of the information handling system 100. In this embodiment, the pair of Wi-Fi antennas 154-1 and 154-2 and the monopole antennas 152-1, 152-2 may operate in a MIMO Wi-Fi-6 or 6E configuration. This may allow the pair of Wi-Fi antennas 154-1 and 154-2 and monopole antennas 152-1, 152-2 to transmit and receive data at a relatively faster rate with plural MIMO wireless links.

As described herein, the monopole antennas 152-1, 152-2 may operate in accordance with any wireless data communication standards. To communicate with a wireless network, standards including IEEE 802.11 WLAN standards, IEEE 802.15 WPAN standards, WWAN such as 3GPP or 3GPP2, or similar wireless standards may be used. Wireless interface adapter (not shown) may connect to any combination of cellular wireless connections including 2G, 2.5G, 3G, 4G, 5G or the like from one or more service providers.

Utilization of radiofrequency communication bands according to several example embodiments of the present disclosure may include bands used with the WLAN standards and WWAN standards which may operate in both licensed and unlicensed spectrums. This allows the monopole antennas 152-1, 152-2 to operate individually to connect to a WLAN or WWAN or cooperate with other antennas within the information handling system 100 to connect to those WLAN or WWANs under a N×N MIMO connection.

In an embodiment, the information handling system 100 may further include a pair of WWAN antennas 158-1 and 158-2 at locations shown by dashed lines. These pair of WWAN antennas 158-1 and 158-2 may be used to connect to any combination of cellular wireless connections including 4G and 5G or the like from one or more service providers. When operated with the monopole antennas 152-1, 152-2, the pair of WWAN antennas 158-1 and 158-2 may operate as a 4×4 MIMO 4G or 5G configuration so that data may be transmitted and received at a relatively higher rate.

The placement of the monopole antennas 152-1, 152-2 at the ends of the handle 150 where the handle lugs (shown below) are present allows for the addition of two additional antennas within the chassis at a location that would otherwise not have been used. This also alleviates the need to put an antenna within the handle 150 itself. Where an antenna is placed within the handle 150, the use of the handle 150 by the user may affect the transmission capabilities of such an antenna. By moving this antenna to the terminal ends of the handle 150 by the handle lugs, this alleviates these issues and further increases the transmission capabilities of the monopole antennas 152-1, 152-2 via the inclusion of the handle lug parasitic coupling device (shown below) acting as a parasitic element to allow for a variety of RF emissions (e.g., 2.4 GHz, 5 GHz, 1.8 GHz, 3 GHz) depending on the dimensions of the monopole antennas 152-1, 152-2 and the handle lug parasitic coupling device as described and show further herein.

Figure 2:
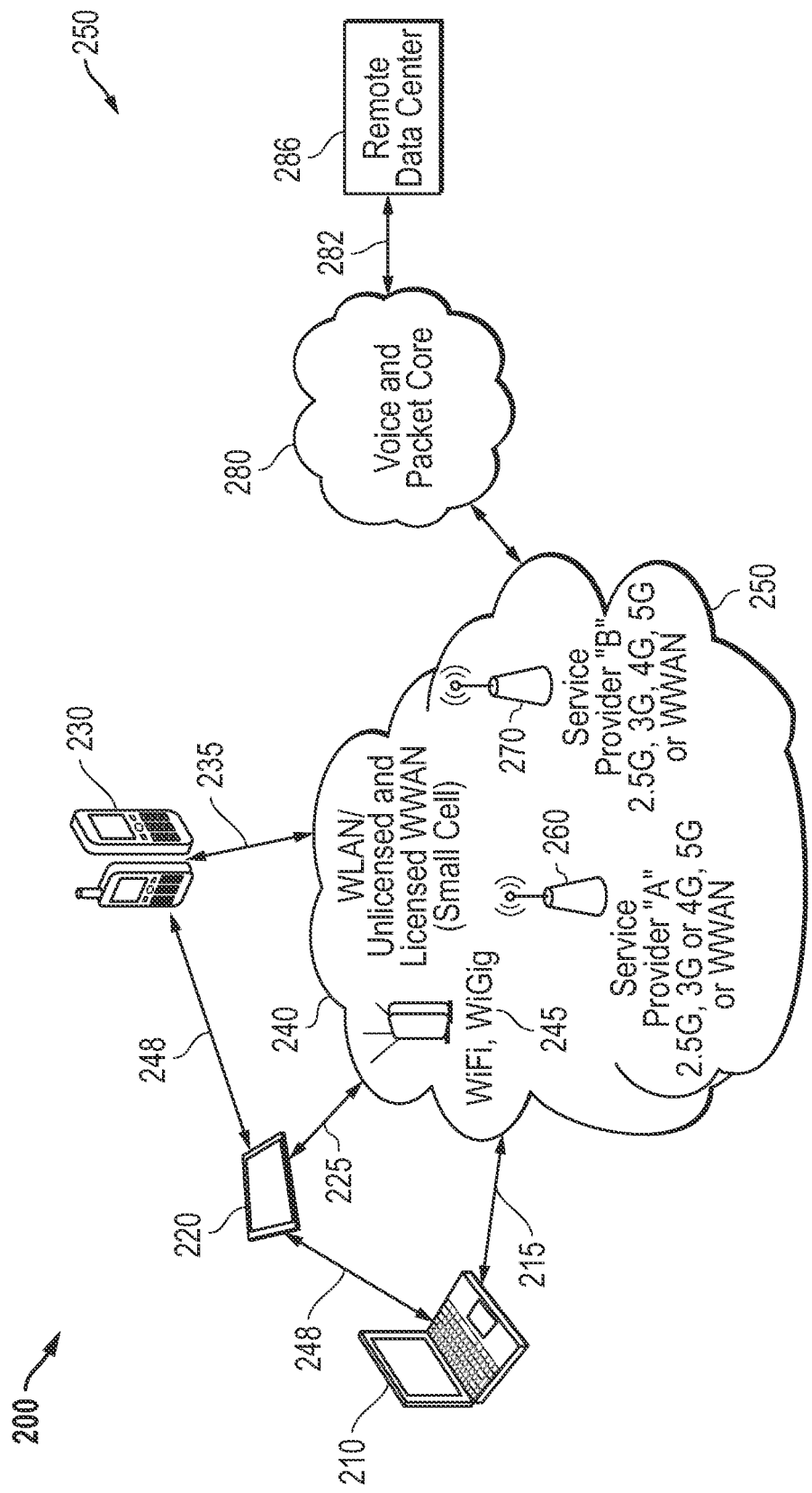
FIG. 2 is a block diagram of a network environment offering several communication protocol options and mobile information handling systems according to an embodiment of the present disclosure.

FIG. 2 is a block diagram of a network environment 200 offering several communication protocol options and mobile information handling systems 210, 220, 230 according to an embodiment of the present disclosure. The information handling systems 210, 220, 230 shown in FIG. 2 may be similar to the information handling system 100 described in connection with FIGS. 1A and 1B. In a particular embodiment, network 200 includes networked mobile information handling systems 210, 220, and 230, wireless network access points, and multiple wireless connection link options. A variety of additional computing resources of network 200 may include client mobile information handling systems, data processing servers, network storage devices, local and wide area networks, or other resources as needed or desired. As partially depicted, information handling systems 210, 220, 230 may be a laptop computer, tablet computer, 360-degree convertible systems, wearable computing devices, a ruggedized information handling system depicted in FIG. 1B, or a smart phone device. These mobile information handling systems 210, 220, and 230, may access a wireless local network 240, or they may access a cellular network 250. For example, the wireless local network 240 may be the wireless local area network (WLAN), or a wireless personal area network (WPAN). In another example embodiment, a wireless cellular network 250 may be a wireless wide area network (WWAN). In an example embodiment, LTE-LAA WWAN may operate with a small-cell WWAN wireless access point option or provide cellular base station options such as 260 and 270.

Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network such as a voice and packet core 280. For example, wireless network access points may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, or IEEE 802.11ax-2021, (e.g., Wi-Fi 6 and 6E, 6 GHz technologies), and access points 245. WWAN communication may be across 4G or 5G small cell WWAN communications such as gNodeB, eNodeB, or similar wireless network protocols and access points in an LTE cellular network 250. Alternatively, other available wireless links within network 200 may include cellular connections 250 via one or more service providers base stations 260 and 270. As described herein, a plurality of antennas may be operatively coupled to any of the cellular connections 250 via one or more service providers 260 and 270 small cell nodes, or to the wireless local area networks (WLANs) selectively based on the operating parameters of the monopole antennas located at the terminal ends of the handle. Service provider cellular connections may include 2G standards such as GSM, 2.5G standards such as GSM EDGE and GPRS, 3G standards such as W-CDMA/UMTS and CDMA 2000, 4G standards, or emerging 5G standards and may variously include WiMAX, LTE, and LTE Advanced, LTE-LAA, small cell WWAN, and the like.

Wireless local network 240 and cellular network 250 may include a variety of licensed, unlicensed, or shared communication frequency bands as well as a variety of wireless protocol technologies ranging from those operating in macrocells, small cells, picocells, or femtocells. As described herein, utilization of RF communication bands according to several example embodiments of the present disclosure may include bands used with the WLAN standards or WWAN standards which may operate in both licensed and unlicensed spectrums. Each of the information handling systems 210, 220, 230 may adjust their network connections and antennas used to operatively couple to those networks based on this data descriptive of the networks. WLAN, for example, may operate at a 2.4 GHz band, a 5 GHz band, or a 6 GHz band. WWAN may operate in a number of bands, some of which are propriety but may include a wireless communication frequency band at approximately 2.5 GHz band in another example. In additional examples, WWAN carrier licensed bands may operate at frequency bands of approximately 700 MHz, 800 MHz, 1900 MHz, or 1700/2100 MHz for example as well. It is understood that any number of available channels may be available under the 5 GHz shared communication frequency band for WLAN. In an embodiment, WWAN may operate in a number of bands, some of which are proprietary but may include a wireless communication frequency band at approximately 2.5 GHz or 5 GHz bands for example. Example communication frequency bands may include unlicensed 5 GHz frequency bands or 3.5 GHz conditional shared communication frequency bands under FCC Part 96. Wi-Fi ISM frequency bands may be subject to sharing include 2.4 GHz, 60 GHz, 900 MHz or similar bands as understood by those of skill in the art. In additional examples, WWAN carrier licensed bands may operate at frequency bands of approximately 700 MHz, 800 MHz, 1900 MHz, or 1700/2100 MHz as well as the new radio frequency range (NRFR) 1 and NFRF 2, bands, and other known bands in sub-6 GHz or greater than 6 GHz bands. In further examples, WLAN communications may include those frequencies associated with the execution of a Wi-Fi 6 or 6E standards (IEEE 802.11ax standards) such as frequencies meeting and exceeding 6 GHz. In an embodiment, the monopole antennas described herein may operate WLAN communications using those frequencies associated with the execution of a Wi-Fi 6 or 6E standards along with any other Wi-Fi antennas formed in the chassis of the information handling systems 210, 220, 230. In the example embodiment, mobile information handling systems 210, 220, and 230 include both unlicensed wireless RF communication capabilities as well as licensed wireless RF communication capabilities due to the capabilities of the monopole antennas described herein. For example, licensed wireless RF communication capabilities may be available via a subscriber carrier wireless service. With the licensed wireless RF communication capability, WWAN RF front end may operate on a licensed WWAN wireless radio with authorization for subscriber access to a wireless service provider on a carrier licensed frequency band.

In some embodiments according to the present disclosure, a networked mobile information handling system 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or the plurality of antennas in each information handling system 210, 220, 230 may be used on each of the wireless communication devices such as according to embodiments herein and may be suited to plural RF bands or plural wireless protocols according to embodiments of the present disclosure. Example competing protocols may be local wireless network access protocols such as Wi-Fi/WLAN, WiGig, and small cell WWAN in an unlicensed, shared communication frequency band. Within local portion of wireless network 250 access points for Wi-Fi or WiGig as well as small cell WWAN connectivity may be available in emerging 5G technology. This may create situations where a plurality of antenna systems are operating on a mobile information handling system 210, 220 or 230 via concurrent communication wireless links on both WLAN and WWAN and which may operate within the same, adjacent, or otherwise interfering communication frequency bands. The antenna or antennas may be transmitting antennas that include high-band, medium-band, low-band, and unlicensed band transmitting antennas in embodiments herein. The antennas may cooperate with other antennas in a N×N MIMO array configuration according to the embodiments described herein. Alternatively, embodiments may include a single transceiving antenna capable of receiving and transmitting, and/or more than one transceiving antennas. Each of the antennas included in the information handling system 100 in an embodiment may be subject to the FCC regulations on specific absorption rate (SAR).

The voice and packet core network 280 shown in FIG. 2 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile information handling systems such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more mobile information handling systems 210, 220, and 230. Alternatively, mobile information handling systems 210, 220, and 230 may connect to the external network via base station locations at service providers such as 260 and 270. These service provider locations may be network connected via backhaul connectivity through the voice and packet core network 280.

Remote data centers 286 may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile information handling systems 210, 220, and 230 allowing streamlining and efficiency within those devices. Similarly, remote data center permits fewer resources to be maintained in other parts of network 200.

Although 215, 225, and 235 are shown connecting wireless adapters of mobile information handling systems 210, 220, and 230 to wireless networks 240 or 250, a variety of wireless links are contemplated. Wireless communication may link through a wireless access point 245 (Wi-Fi or WiGig), through WWAN small cell base stations such as in network 240 or through a service provider tower such as that shown with service provider A 260 or service provider B 270 and in network 250. In other aspects, mobile information handling systems 210, 220, and 230 may communicate intra-device via 248 when one or more of the mobile information handling systems 210, 220, and 230 are set to act as an access point or even potentially an WWAN connection via small cell communication on licensed or unlicensed WWAN connections. For example, one of mobile information handling systems 210, 220, and 230 may serve as a Wi-Fi hotspot in an embodiment. Concurrent wireless links to information handling systems 210, 220, and 230 may be connected via any access points including other mobile information handling systems as illustrated in FIG. 2.

As described herein, the information handling systems 210, 220, and 230 may concurrently communicate with a wireless local network 240 and a WWAN small cell base stations or cellular network 250 using the antennas within each of the information handling systems 210, 220, and 230. For example, each of the information handling systems 210, 220, and 230 may be similar to the information handling system described in connection with FIG. 1A or 1B with more than one antenna associated with an antenna front end and more than one antenna associated with the cellular antenna front end (e.g., FIG. 1A, 130).

Figure 3:
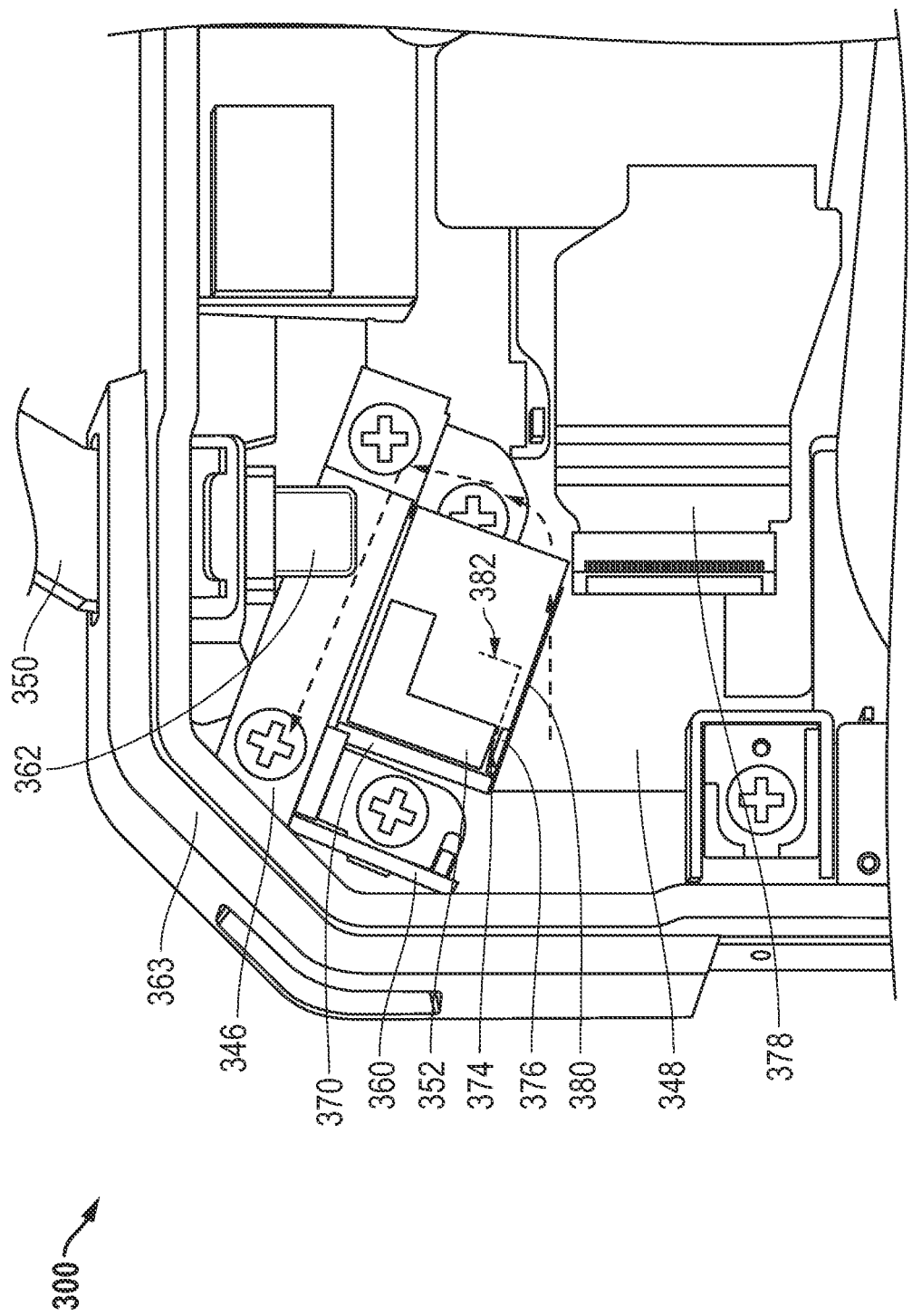
FIG. 3 is a graphical illustration, cross section view of an information handling system having a housing for a display, an antenna, and a handle lug according to another embodiment of the present disclosure.

FIG. 3 is a graphical illustration, cross section view of an information handling system 300 having a housing 368 for a display, a monopole antenna 352, and a handle lug 362 according to another embodiment of the present disclosure. FIG. 3 shows an enlarged area of the information handling system 300 at a location where the handle 350 meets the housing 368 of the information handling system 300. In FIG. 3, the handle 350 is operatively coupled to the information handling system 300 via the handle lug 362. In an embodiment, this similar structure may be repeated, in mirror fashion, at an opposite end of the information handling system 300 where a second end of the handle 350 meets the housing 368 and where a second handle lug 362 operatively couples the other side of handle 350 to the chassis of the information handling system 300. In this embodiment, the number of additional antennas added to the information handling system 300 may be increased thereby increasing the ability of the information handling system 300 to be operatively coupled to a WWAN or a WLAN via, for example, a N×N MIMO configuration (e.g., N equals 2, 3, 4, etc.) by utilizing the area of housing 368 near handle lug 362.

In one embodiment shown in FIG. 3, the monopole antenna 352 is sized and arranged to operate as a Wi-Fi antenna that operates at frequencies associated with Wi-Fi, Wi-Fi 6, and/or Wi-Fi 6E. These frequencies may range from 2.4 Ghz, 5 GHz, and/or within the 5 Ghz to 7 GHz range according to the Wi-Fi 6E standards. In another embodiment, the monopole antenna 352 is sized and arranged to operate as an WWAN antenna under, for example, an LTE mobile broadband standard at frequencies associated with 2G, 3G, 4G, and 5G, standards at a variety of frequencies including 5 GHz, 6 GHz, and frequencies above 6 GHz as well as those other frequencies described herein.

In an embodiment, the monopole antenna 352 may act as a passive antenna capable of transceiving at any of these frequencies concurrently. In an embodiment, the monopole antenna 352 may be operated by a wireless interface adapter (not shown) that includes an antenna front end (not shown) and other RF subsystems (not shown). The wireless interface adapter, antenna front end, and RF subsystems may include any circuitry used to filter various frequencies such as a high-pass filter or a low-pass filter in order to tune the monopole antenna 352 to send and receive specific frequencies (e.g., 2.4 Ghz, 5 GHz, and/or within the 5 Ghz to 7 GHz range). In an embodiment, the monopole antenna 352 is about 7-8 mm long in order to resonate at the frequencies described herein such as those associated with Wi-Fi 6E.

The monopole antenna may be formed on a plastic antenna structure 370. In an embodiment, a laser direct structuring process may be applied to this plastic structure 370 such that the monopole antenna 352 of a conductive material is formed thereon. This process may include taking a thermoplastic material doped with a non-conductive metallic inorganic compound and activating the surface thereof to form a number of metal additive tracks. These tracks may then be overlayed with a metal such as copper in an electroless bath thereby forming the monopole antenna 352 on the surface of the plastic antenna structure 370. The present specification contemplates, however, that any process may be conducted to overlay the monopole antenna 352 onto the surface of the plastic antenna structure 370.

Along with the monopole antenna 352, the plastic antenna structure 370 may have a reference ground 376 formed thereon with a feed excitation point 374 operatively coupling the monopole antenna 352 to ground 380. The excitation feed 382 may originate from an antenna front end (not shown) via a coaxial cable. In an embodiment, an antenna RF subsystem may include an oscillator used to excite the monopole antenna 352 via the excitation feed 382. The reference ground 376 may be operatively coupled to the ground 380 formed on a side of the plastic antenna structure 370. This ground 380 is further operatively coupled to a grounding tape 348 and the handle lug parasitic coupling device 346. Additionally, the ground 380, grounding tape 348, and handle lug parasitic coupling device 346 may be operatively coupled to a ground source at the flex cable 378 and motherboard as described herein. As such, in an embodiment, the handle lug parasitic coupling device 346 acts as part of the grounding system used to prevent EMI from interrupting the operation of the monopole antenna 352 by grounding any errant EMI at the handle lug parasitic coupling device 346 and grounding it away from the monopole antenna 352 and handle lug parasitic coupling device 346 as described.

The handle lug parasitic coupling device 346 also acts as a parasitic device to allow the monopole antenna 352 to increase the number of bands and frequencies that can be used to transmit and receive data. For example, where the monopole antenna 352 is about 7-8 mm long, the handle lug parasitic coupling device 346 may be 25 mm long in order to increase the range of frequencies. In this embodiment, the monopole antenna 352 (7-8 mm long) may resonate at a frequency of 5 GHz while the handle lug parasitic coupling device 346 may also allow for a 2.4 GHz resonant frequency (indicated by the dashed arrows) to be emitted. As described herein, the monopole antenna 352 may be operatively coupled to an antenna front end (not shown) and other RF subsystems (not shown). Among the circuitry associated with the antenna front end and RF subsystems, a high-pass and low-pass filter may be present to receive and send data at these specific frequencies at the monopole antenna 352 concurrently.

In an embodiment, the information handling system 300 may include a lanyard and lanyard tether hook 360. The lanyard operatively coupled to the lanyard tether hook 360 may be used by a user to transport the information handling system 300 from one location to another similar to the handle 350 described herein. The lanyard tether hook 360 may be affixed to the chassis of the housing 368 of the information handling system 300 at a corner located by the plastic antenna structure 370.

As indicated in FIG. 1B, the monopole antenna 352 may operate with other antennas as described herein in order to transmit and receive data quickly. As described herein, the information handling system 300 may include a pair of Wi-Fi antennas (not shown) formed into a side of the chassis of the information handling system 300. This pair of Wi-Fi antennas may be dedicated to operatively couple the information handling system 300 to an access point of a WLAN. The monopole antenna 352 (along with the other located at the opposite end of the handle 350) may be configured to operate as a WLAN antenna using, for example a Wi-Fi 6 or 6E standard similar to the pair of Wi-Fi antennas formed along the sides of the chassis of the information handling system 300. In this embodiment, the pair of Wi-Fi antennas and the monopole antennas 352 may operate in a MIMO Wi-Fi-6 or 6E configuration. This may allow the pair of Wi-Fi antennas and monopole antennas 352 to transmit and receive data at a relatively faster rate.

Figure 4:
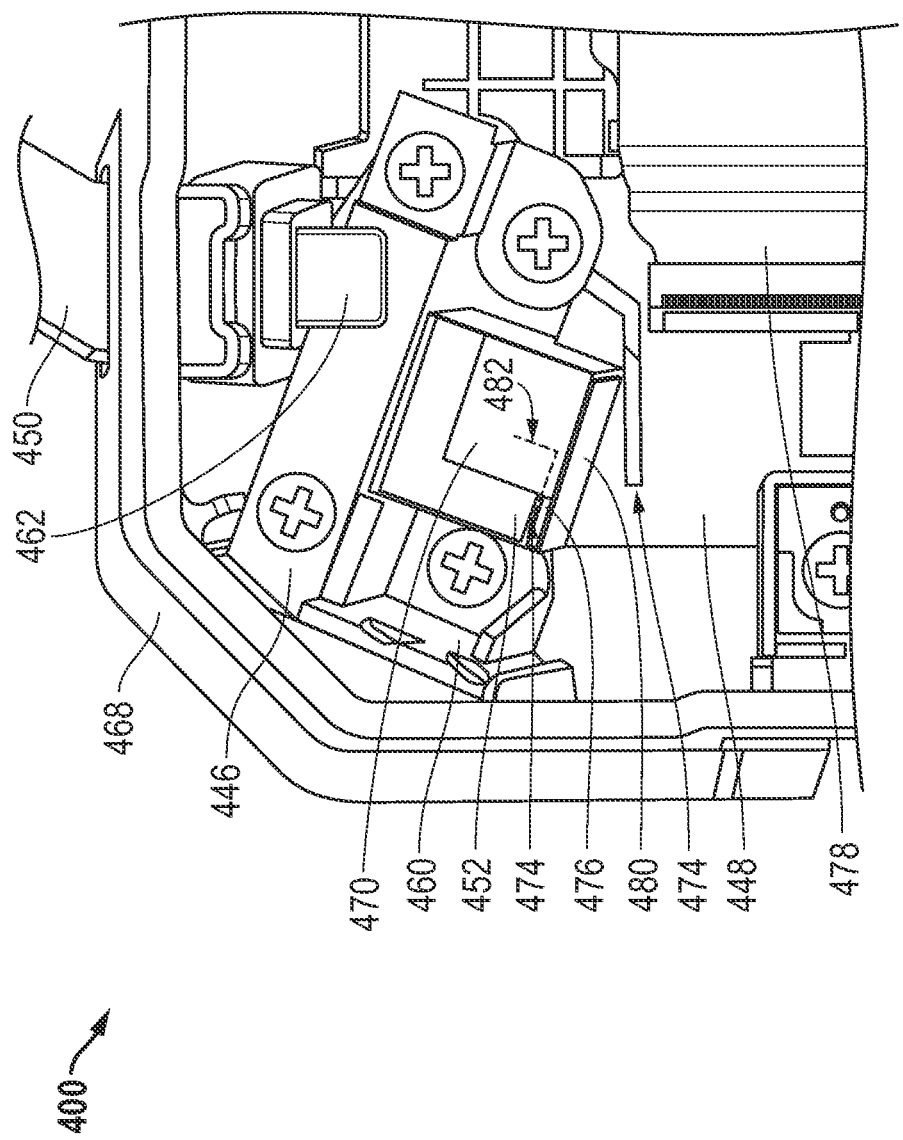
FIG. 4 is a graphical illustration, cross section view of an information handling system having a housing for a display, an antenna, and a handle lug according to another embodiment of the present disclosure.

FIG. 4 is a graphical illustration, cross section view of an information handling system 400 having a housing 468 for a display, a monopole antenna 352, and a handle lug 362 according to another embodiment of the present disclosure. FIG. 4, similar to FIG. 3, shows an enlarged area of the information handling system 400 at a location where handle 450 meets the housing 468 of the information handling system 400. In FIG. 4, the handle 450 is operatively coupled to the information handling system 400 via the handle lug 462. In an embodiment, this similar structure may be repeated, in mirror fashion, at an opposite end of the information handling system 400 where a second end of the handle 450 meets the housing 468 and where a second handle lug 462 operatively couples the handle 450 to the chassis of the information handling system 400. In this embodiment, the number of additional antennas added to the information handling system 400 may be increased thereby increasing the ability of the information handling system 400 to be operatively coupled to a WWAN or a WLAN via, for example, a N×N MIMO configuration (e.g., N equals 2, 3, 4, etc.) with utilization of space by the handle lugs to place a monopole antenna 452 and antenna and handle lug parasitic coupling device 446. In the embodiment shown in FIG. 4, the monopole antenna 452 is sized and arranged to operate as a WWAN antenna that operates at frequencies associated with LTE mobile broadband standards 2G, 3G, 4G, or 5G standards including 5 GHz, 6 GHz, and frequencies above 6 GHz as well as those other frequencies described herein.

In an embodiment, the monopole antenna 452 may act as a passive antenna capable of transceiving at any of these frequencies concurrently. In an embodiment, the monopole antenna 452 may be operated by a wireless interface adapter (not shown) that includes an antenna front end (not shown) and other RF subsystems (not shown). The wireless interface adapter, antenna front end, and RF subsystems may include any circuitry used to filter various frequencies such as a high-pass filter or a low-pass filter in order to tune the monopole antenna 452 to send and receive specific frequencies (e.g., 1.8 GHz and 3 GHz among others). In this embodiment, shown in FIG. 4, the monopole antenna 452 is about 15 mm long in order to resonate at the frequencies described herein such as those associated with LTE communications.

The monopole antenna 452 may be formed on a plastic antenna structure 470. In an embodiment, a laser direct structuring process may be applied to this plastic structure 470 such that the monopole antenna 452 of conductive material is formed thereon. This process may include taking a thermoplastic material doped with a non-conductive metallic inorganic compound and activating the surface thereof to form a number of metal additive tracks. These tracks may then be overlayed with a metal such as copper in an electroless bath thereby forming the monopole antenna 452 on the surface of the plastic antenna structure 470. The present specification contemplates, however, that any process may be conducted to overlay the monopole antenna 452 onto the surface of the plastic antenna structure 470.

Along with the monopole antenna 452, the plastic antenna structure 470 may have a reference ground 476 formed thereon with a feed excitation point 474 operatively coupling the monopole antenna 452 to ground 480. The excitation feed 482, like described in connection with FIG. 3, may originate from an antenna front end (not shown) via a coaxial cable. In an embodiment, the RF subsystem may include an oscillator used to excite the monopole antenna 452 via the excitation feed 482. The reference ground 476 may be operatively coupled to the ground 480 formed on a side of the plastic antenna structure 470. This ground 480 is further operatively coupled to a grounding tape 448 and the handle lug parasitic coupling device 446. Additionally, the ground 480, grounding tape 448, and handle lug parasitic coupling device 446 may be operatively coupled to a ground source at the flex cable 478 and motherboard as described herein. As such, in an embodiment, the handle lug parasitic coupling device 446 acts as part of the grounding system used to prevent EMI from interrupting the operation of the monopole antenna 452 by grounding any errant EMI at the handle lug parasitic coupling device 446 and grounding it away from the monopole antenna 452 and handle lug parasitic coupling device 446 as described.

The handle lug parasitic coupling device 446 also acts as a parasitic device to allow the monopole antenna 452 to increase the number of bands and frequencies that can be used to transmit and receive data. For example, where the monopole antenna 452 is about 15 mm long, the handle lug parasitic coupling device 446 may be between 30-35 mm long in order to increase the range of frequencies. In this embodiment, the monopole antenna 452 may resonate at a frequency of 3 GHz while the handle lug parasitic coupling device 446 may also allow for a 1.8 GHz resonant frequency to be emitted. As described herein, the monopole antenna 452 may be operatively coupled to an antenna front end (not shown) and other RF subsystems (not shown). Among the circuitry associated with the antenna front end and RF subsystems, a high-pass and low-pass filter may be present to receive and send data at these specific frequencies at the monopole antenna 452 concurrently.

In an embodiment, the information handling system 400 may include a lanyard and lanyard tether hook 460. The lanyard operatively coupled to the lanyard tether hook 460 may be used by a user to transport the information handling system 400 from one location to another similar to the handle 450 described herein. The lanyard tether hook 460 may be affixed to the chassis of the housing 468 of the information handling system 400 at a corner located by the plastic antenna structure 470.

As indicated in FIG. 1B, the monopole antenna 452 may operate with other antennas as described herein in order to transmit and receive data quickly. As described herein, the information handling system 400 may include a pair of WWAN antennas (not shown) formed into a top side of the chassis of the information handling system 400. This pair of WWAN antennas may be dedicated to operatively couple the information handling system 400 to a base station of a WWAN. The monopole antenna 452 (along with the other located at the opposite end of the handle 450) may be configured to operate as a WWAN antenna using, for example a 4G or 5G standard, for example, similar to the pair of WLAN antennas formed along the top side of the chassis of the information handling system 400. In this embodiment, the pair of WWAN antennas and the monopole antennas 452 may operate in a MIMO 5G configuration. This may allow the pair of WWAN antennas and monopole antennas 452 to transmit and receive data at a relatively faster rate.

FIG. 4 further shows that a portion of the grounding tape 448 includes a cut-out portion 474. This cut-out portion 474 effectively increases the length of the handle lug parasitic coupling device 446 around the plastic antenna structure 470. This effective longer handle lug parasitic coupling device 446, due to the creation of the cut-out portion 474 in the grounding tape 448, causes the ground current to meander around the inner edges of the cut-out portion 474 prior to reaching the handle lug parasitic coupling device 446 thereby changing the excitation current at the handle lug parasitic coupling device 446. In an embodiment, a relatively lower frequency can be emitted from the handle lug parasitic coupling device 446 such as the 1.8 GHz frequency range described herein. In this way and with the inclusion of the cut-out portion 474 other cut-out portions 474 in the grounding tape 448, the frequencies made available to the monopole antenna 452 may be increased. In an embodiment, the cut-out portion 474 may be lengthened or shortened in order to change a resulting excitation frequency at the monopole antenna 452.

Figure 5:
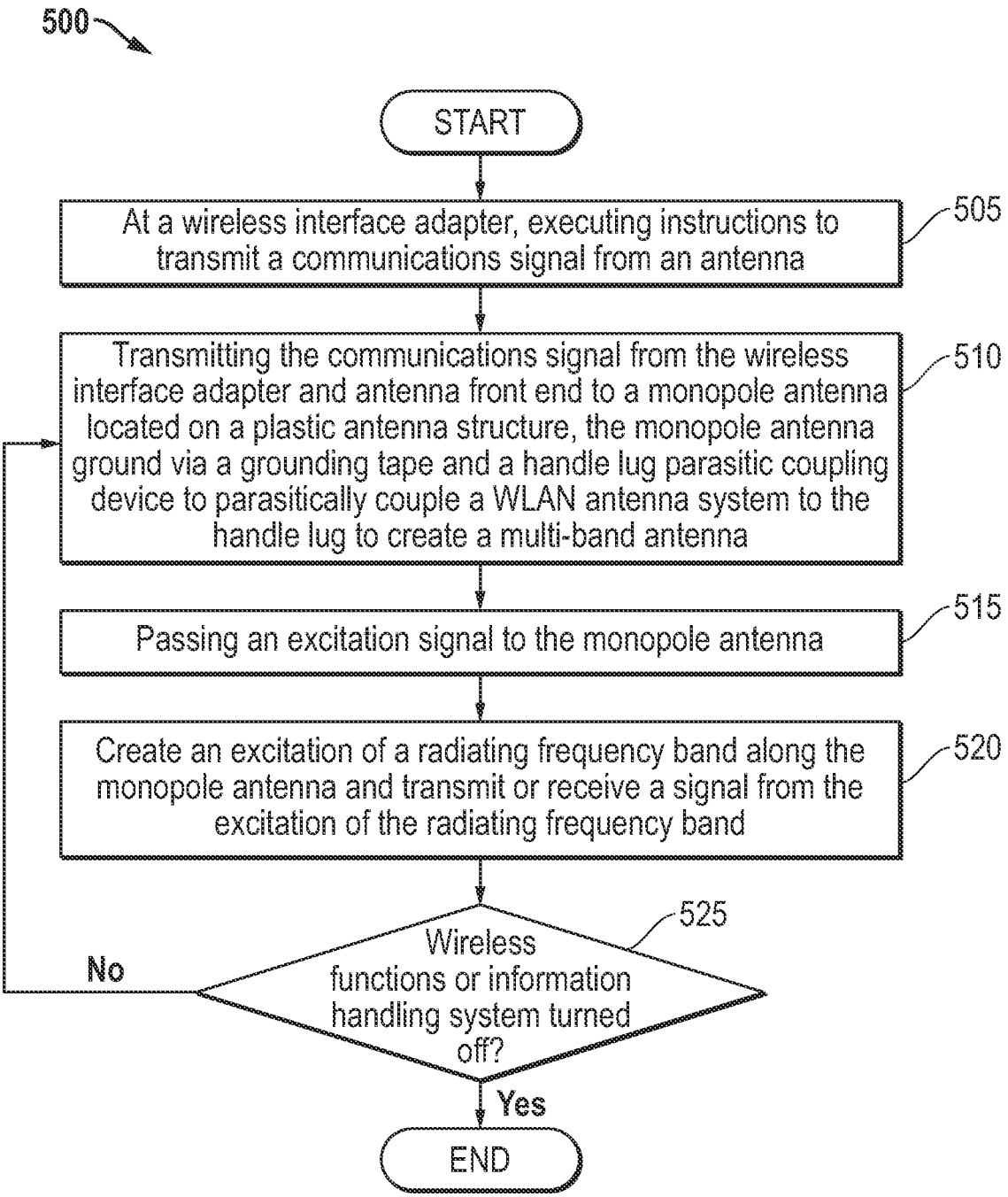
FIG. 5 is a flow diagram illustrating a method for operating an information handling system having a handle and an antenna formed at a location where the handle is coupled to the chassis of the information handling system via a handle lug according to an embodiment of the present disclosure.

FIG. 5 is a flow diagram illustrating a method 500 for operating an information handling system having a handle and an antenna formed at a location where the handle is coupled to the chassis of the information handling system via a handle lug according to an embodiment of the present disclosure. The method may include, at block 505, executing instructions to transmit a communications signal from an antenna at a wireless interface adapter. These instructions may include instructions to upload or download data from and to the information handling system, respectively. This process may use a processor and a wireless interface adapter with its antenna front end and RF subsystem as described herein.

The method 500 may further include, at block 510, transmitting the communications signal from the wireless interface adapter and antenna front end to a monopole antenna located on a plastic antenna structure with the monopole antenna grounded via a grounding tape and a handle lug parasitic coupling device. Further, the handle lug parasitic coupling device may parasitically couple a WLAN or WWAN antenna system to the handle lug to create a multi-band antenna. In an embodiment, the handle lug parasitic coupling device may be operatively coupled to a handle lug used to couple a handle of the information handling system to a body or chassis of the information handling system. This allows the handle lug parasitic coupling device to be coupled at a location within the chassis of the information handling system that may be otherwise unused and where the monopole antenna is present or may be placed without increasing the space within the chassis of the information handling system or using space elsewhere within the chassis dedicated to other hardware.

The handle lug parasitic coupling device being operatively coupled to a monopole antenna may be used to selectively change the RF emitted from the monopole antenna structure so that the range of RF bands emitted or received by the monopole antenna may be increased. The monopole antenna, in an embodiment, is sized to emit or receive radio frequencies that include those radio frequencies associated with any 4G or 5G, licensed or unlicensed radio frequencies as within the capability of a particular monopole antenna based on length or grounding. In an embodiment, the monopole antenna with the handle lug parasitic coupling device may operate at a 2.4 GHz frequency. In an embodiment, the monopole antenna with the handle lug parasitic coupling device may operate at a 5 GHz frequency. In an embodiment, the monopole antenna with the handle lug parasitic coupling device may operate, concurrently, at a 2.4 GHz frequency and a 5 GHz frequency concurrently. In an embodiment, the monopole antenna may resonate at a frequency of 3 GHz while the handle lug parasitic coupling device may also allow for a 1.8 GHz resonant frequency to be emitted.

Along with operating as a parasitic element, the handle lug parasitic coupling device may operate a part of an EMI grounding element. The information handling system may include other hardware devices such as a camera that are placed next to or proximate to the monopole antenna. These types of hardware devices may be susceptible to EMI surges and may even be damaged should the levels of EMI (e.g., an electromagnetic surge) are present during operation of the information handling system. In an embodiment, these hardware devices may include a flexible cable that is grounded to the mother board via a grounding line in the flexible cable. This grounding line in the flexible cable may be grounded to the mother board which, itself, may include a grounding source. In an embodiment, the handle lug parasitic coupling device operatively coupled to the handle lug acts as an EMI grounding element through the ground at the flexible cable and to ground at the motherboard.

The method 500 may further include passing the excitation signal to the monopole antenna at block 515. In an embodiment, the feed PCB may cause the excitation signal to pass across a portion of the display housing to the monopole antenna in the sidewall. In an embodiment, the excitation signal may have been converted to a current at the feed PCB such that excitation of the antenna using that specific current causes the antenna to radiate a specific RF frequency band for a particular wireless protocol utilized by the wireless interface adapter. In an embodiment, the excitation signal may be passed via an excitation feed, such as a coaxial cable to a plastic antenna structure supporting the monopole antenna 515

At block 520, the method 500 may continue with creating an excitation of a radiating frequency band along the monopole antenna and transmit a wireless signal or receive a wireless signal in communication with an access point or base station. As described herein, the length of the monopole antenna may determine the RF or range of RF that may be emitted by the monopole antenna. In an embodiment, the monopole antenna may be operatively coupled to a tunable capacitor that enables the monopole antenna to resonate at and emit RFs that include those RFs associated with any 4G or 5G, Wi-Fi, licensed, or unlicensed RFs. The RFs used may allow the information handling system to connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band in example embodiments. WLAN, for example, may also operate at a 2.4 GHz band. Wi-Fi 6 or 6E may operate at 5 GHz or 5-7 GHz bands. WWAN may operate in a number of bands, some of which are propriety but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. WWAN may operate in a number of bands, some of which are proprietary but may include a wireless communication frequency band at approximately 2.5 GHz or 5 GHz bands for example. In additional examples, WWAN carrier licensed bands may operate at frequency bands of approximately 700 MHz, 800 MHz, 1900 MHz, or 1700/2100 MHz as well as the NRFR1 or NFRF2 bands (at sub 6 GHz or greater than 6 GHz), and other known bands. In the example embodiment, mobile information handling system includes both unlicensed wireless RF communication capabilities as well as licensed wireless RF communication capabilities. For example, licensed wireless RF communication capabilities may be available via a subscriber carrier wireless service. With the licensed wireless RF communication capability, WWAN RF front end may operate on a licensed WWAN wireless radio with authorization for subscriber access to a wireless service provider on a carrier licensed frequency band.

The method 500 may also include determining whether the wireless functions for the information handling system has been turned off at block 825. Where the wireless functions or the information handling system has not been turned off, the method 500 may continue at block 810 with the transmission of data over the monopole antenna as described herein. Where either the wireless functions or the information handling system has been turned off at block 825, the method 500 may end here.

The blocks of flow diagram of FIG. 5 discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system to wirelessly transmit and receive data at an antenna comprising:
   a processor;
   a memory;
   a power management unit;
   a display housing containing components of the information handling system, the display housing including a handle and a handle lug to secure the handle to the display housing;
   a wireless adapter transmit data wirelessly via a WLAN antenna; and
   a handle lug parasitic coupling device operatively coupled to the handle lug to parasitically couple the WLAN antenna to a handle lug parasitic coupling device and handle lug to create a multi-band WLAN antenna.

2. The information handling system of claim 1 further comprising:
   a camera device formed into the display housing; and
   a conductive tape to provide an electromagnetic interference grounding source for the camera device and to operatively couple the grounding source to the handle lug parasitic coupling device.

3. The information handling system of claim 1 further comprising:
   the multi-band WLAN antenna operating concurrently at 5 GHz and 2.4 GHz.

4. The information handling system of claim 1 further comprising:
   a conductive tape to provide an electromagnetic interference grounding source for I/O device to the handle lug parasitic coupling device, the conductive tape including a cut out slot formed therein to create an extended radiating surface to radiate at a lower frequency band.

5. The information handling system of claim 1 further comprising:
   the WLAN antenna being a monopole antenna with a length of 25 mm and radiating at 2.4 GHz.

6. The information hanlding system of claim 1 further comprising:
   the WLAN antenna being a monopole antenna with a length of 7 mm and radiating at 5 GHz.

7. The information handling systme of claim 1 further comprising:
   a second handle lug parasitic coupling device placed at an opposite terminal end of the handle and proximate to a corner of the display housing;
   a second handle lug coupling the second handle lug parasitic coupling device to a second WLAN antenna to create a second multi-band WLAN antenna;
   wherein the wireless adapter configures the multi-band WLAN antenna and second multi-band WLAN antenna to form a MIMO configuration to operate under a Wi-Fi 6E standard.

8. A ruggedized information handling system, comprising:
   a chassis housing a display device, a processor, a memory, and a power management unit, the chassis including a back plane and sidewalls formed along edges of the back plane;
   a handle operatively coupled to the chassis via one or more handle lugs, a first handle lug operating as a first handle lug parasitic coupling device to parasitically couple with a WLAN antenna, operated by a wireless adapter of the information handling system, to create a first multi-band WLAN antenna.

9. The ruggedized information handling system of claim 8 further comprising:
   an input/output (I/O) device formed into the display housing;
   a conductive tape to provide an electromagnetic interference grounding source for the I/O device and to operatively couple the I/O device to the handle lug parasitic coupling device.

10. The ruggedized information handling system of claim 8 further comprising:
    the multi-band WLAN antenna operating concurrently at 5 GHz and 2.4 GHz.

11. The ruggedized information handling system of claim 9 further comprising:
    the conductive tape including a cut out slot formed therein to create a radiating edge with the handle lug parasitic coupling element to radiate at 1.8 GHz.

12. The ruggedized information handling system of claim 8 further comprising:
    the first WLAN antenna being a monopole antenna with a length of 25 mm and radiating at 2.4 GHz via the use of the first handle lug parasitic coupling device.

13. The ruggedized information handling system of claim 8 further comprising:
the first WLAN antenna being a monopole antenna with a length of 7 mm and radiating at 5 GHz.

14. The ruggedized information handling system of claim 8 further comprising:
a lanyard tether hook formed into a sidewall of the chassis housing to couple a lanyard thereto.

15. A ruggedized information handling system comprising:
a processor;
a memory;
a power management unit;
a display housing containing components of the information handling system, the display housing including a handle and a first handle lug to secure the handle to the display housing;
a first handle lug parasitic coupling device to parasitically couple a first antenna to the first handle lug to create a first multi-band antenna;
a wireless adapter to transceive data wirelessly via the first multi-band antenna; and
a conductive tape to provide an electromagnetic interference grounding source for a camera device housed in the display housing and to operatively couple the grounding source to the first handle lug parasitic coupling device.

16. The ruggedized information handling system of claim 15 further comprising:
the multi-band antenna operating concurrently at 5 GHz and 2.4 GHz.

17. The ruggedized information handling system of claim 15 further comprising:
the camera device formed into the display housing; and
a conductive tape to provide an electromagnetic interference grounding source for the camera device and to operatively couple the camera device to the first handle lug parasitic coupling device, the conductive tape including a cut out slot formed therein to create a radiating aperture to radiate at 1.8 GHz.

18. The ruggedized information handling system of claim 15 further comprising:
the wireless adapter to transceive data wirelessly via a WLAN wireless protocol.

19. The ruggedized information handling system of claim 15 further comprising:
the wireless adapter to transceive data wirelessly via a WWAN wireless protocol.

20. The ruggedized information handling system of claim 15 further comprising:
a second handle lug parasitic coupling device placed at a terminal end of the handle and at a corner of the display housing opposite to the first handle lug parasitic coupling device; and
a second handle lug coupling the second handle lug parasitic coupling device to a second antenna to create a second multi-band antenna;
wherein the first multi-band antenna and the second multiband antenna ioerate with the wireless adapter to form a MIMO configuration to operate under a Wi-Fi 6E standard.

* * * * *